US009800854B2

(12) United States Patent
Previti et al.

(10) Patent No.: US 9,800,854 B2
(45) Date of Patent: Oct. 24, 2017

(54) PROCESSES AND DEVICES FOR RECORDING AND REPRODUCING MULTIMEDIA CONTENTS USING DYNAMIC METADATA

(75) Inventors: Gianluca Previti, Turin (IT); Saverio Celia, Turin (IT)

(73) Assignee: SISVEL TECHNOLOGY S.R.L., None (TO) (IT)

( * ) Notice: Subject to any disclaimer, the term of this patent is extended or adjusted under 35 U.S.C. 154(b) by 463 days.

(21) Appl. No.: 13/980,820

(22) PCT Filed: Jan. 18, 2012

(86) PCT No.: PCT/IB2012/050248
§ 371 (c)(1),
(2), (4) Date: Jul. 19, 2013

(87) PCT Pub. No.: WO2012/098509
PCT Pub. Date: Jul. 26, 2012

(65) Prior Publication Data
US 2013/0302006 A1    Nov. 14, 2013

(30) Foreign Application Priority Data
Jan. 20, 2011    (IT) .............................. TO2011A0042

(51) Int. Cl.
*H04N 9/79*    (2006.01)
*G06F 17/30*    (2006.01)

(52) U.S. Cl.
CPC ......... *H04N 9/79* (2013.01); *G06F 17/30017* (2013.01)

(58) Field of Classification Search
CPC .... H04N 21/84; H04N 7/185; H04N 5/23222; H04N 5/23245
See application file for complete search history.

(56) References Cited

U.S. PATENT DOCUMENTS

2002/0131764 A1*  9/2002  David ............... G06F 17/30817
                                                   386/239
2003/0053690 A1*  3/2003  Trifonov ................... G06T 5/40
                                                   382/168
(Continued)

FOREIGN PATENT DOCUMENTS

CN    101617286 A    12/2009
CN    101809590 A     8/2010
(Continued)

OTHER PUBLICATIONS

International Search Report dated Mar. 19, 2012, issued in PCT Application No. PCT/162012/050248 filed Jan. 18, 2012.
(Continued)

*Primary Examiner* — Hung Dang
*Assistant Examiner* — Sunghyoun Park
(74) *Attorney, Agent, or Firm* — Workman Nydegger

(57) ABSTRACT

Processes (and related devices) for capturing and/or reproducing multimedia contents include, in the capturing stage, the steps of: acquiring a multimedia content in the form of a generally time-variable multimedia stream through video acquisition means and possibly also audio acquisition means; acquiring data related to the capturing conditions of the multimedia content (capture parameters) through dynamic monitoring means for monitoring the conditions; storing values dependent on the generally time-variable capture parameters into predetermined areas of the multimedia file associated with the captured multimedia content in the form of dynamic metadata for acquiring the multimedia content; and/or including, in the reproduction stage, the steps of: reading from a memory at least the multimedia file including at least one multimedia content; reading data related to the capturing conditions of the multimedia content (capture parameters) in the form of at least one dynamic metadatum associated with the multimedia content of the (Continued)

multimedia file, and dynamically modifying the modes of reproduction of the multimedia stream corresponding to the multimedia file according to the values of at least the dynamic metadatum associated with the multimedia content.

27 Claims, 7 Drawing Sheets

(56) References Cited

U.S. PATENT DOCUMENTS

| | | | |
|---|---|---|---|
| 2003/0197709 A1* | 10/2003 | Shimazaki | G09G 5/006 345/590 |
| 2004/0184529 A1* | 9/2004 | Henocq | G08B 13/19656 375/240.01 |
| 2004/0258308 A1* | 12/2004 | Sadovsky | H04N 1/32128 382/190 |
| 2005/0062724 A1* | 3/2005 | Kim | H04N 5/44513 345/168 |
| 2005/0083417 A1 | 4/2005 | Battles et al. | |
| 2007/0070069 A1* | 3/2007 | Samarasekera | G06F 3/011 345/427 |
| 2007/0136782 A1* | 6/2007 | Ramaswamy | G11B 27/11 725/138 |
| 2008/0043031 A1 | 2/2008 | Jagmag | |
| 2008/0100645 A1* | 5/2008 | Nitta | G09G 3/3426 345/690 |
| 2009/0055742 A1 | 2/2009 | Nordhagen | |
| 2009/0087016 A1 | 4/2009 | Berestov et al. | |
| 2009/0132489 A1* | 5/2009 | Li | G06F 17/30265 |
| 2009/0161994 A1* | 6/2009 | Sauerwein, Jr. | G06F 17/30817 382/313 |
| 2009/0172720 A1* | 7/2009 | Kiiskinen | H04N 5/445 725/9 |
| 2010/0111489 A1* | 5/2010 | Presler | H04N 5/225 386/278 |
| 2011/0264715 A1* | 10/2011 | Singer | G06F 17/3002 707/825 |

FOREIGN PATENT DOCUMENTS

| | | |
|---|---|---|
| WO | 2005/091622 A1 | 9/2005 |
| WO | 2007/147449 A1 | 12/2007 |

OTHER PUBLICATIONS

Written Opinion dated Mar. 19, 2012, issued in PCT Application No. PCT/162012/050248 filed Jan. 18, 2012.

* cited by examiner

| Entry | Tag | Value | Meaning | Format |
|---|---|---|---|---|
| Make | 010f | Sisvel | | ascii string |
| Model | 0110 | Model 1 | | ascii string |
| Orientation | 0112 | 1 | 0 degrees | unsigned short |
| X Resolution | 011a | 180/1 | 180.00 | unsigned rational |
| Y Resolution | 011b | 180/1 | 180.00 | unsigned rational |
| Resolution Unit | 0128 | 2 | inch | unsigned short |
| Date/Time | 0132 | 2001:06:09 15:17:32 | | ascii string |
| YCbCr Positioning | 0213 | 1 | centre | unsigned short |
| Exif Offset | 8769 | 184 | | unsigned long |
| Exposure Time | 829a | 1/350 | 0.00 | unsigned rational |
| F Number | 829d | 40/10 | 4.00 | unsigned rational |
| EXIF Version | 9000 | 30 32 31 30 | | undefined |
| Date Time Original | 9003 | 2001:06:09 15:17:32 | | ascii string |
| Date Time Digitised | 9004 | 2001:06:09 15:17:32 | | ascii string |
| Component Configuration | 9101 | 01 02 03 00 | | undefined |
| Compressed Bits/Pixel | 9102 | 3/1 | 3.00 | unsigned rational |
| Shutter Speed Value | 9201 | 553859/65536 | 8.45 | signed rational |
| Aperture Value | 9202 | 262144/65536 | 4.00 | unsigned rational |
| Exposure Bias Value | 9204 | 0/3 | 0.00 | signed rational |
| Max Aperture Value | 9205 | 194698/65536 | 2.97 | unsigned rational |
| Subject Distance | 9206 | 3750/1000 | 3.75 | unsigned rational |
| Metering Mode | 9207 | 2 | centre weighted average | unsigned short |
| Flash | 9209 | 0 | not used | unsigned short |
| Focal Length | 920a | 346/32 | 10.81 | unsigned rational |
| Maker Note | 927c | 0a | | undefined |
| User Comment | 9286 | 00 00 00 00 00 00 | | undefined |
| Flash Pix Version | a000 | 30 31 30 30 | | undefined |
| Color Space | a001 | 1 | sRGB | unsigned short |
| Exif Image Width | a002 | 640 | | unsigned short |
| Exif Image Height | a003 | 480 | | unsigned short |
| Exif Interoperability Offset | a005 | 1088 | | unsigned long |
| Focal Plane X Resolution | a20e | 640000/206 | 3106.80 | unsigned rational |
| Focal Plane Y Resolution | a20f | 480000/155 | 3096.77 | unsigned rational |
| Focal Plane Resolution Unit | a210 | 2 | inch | unsigned short |
| Sensing Method | a217 | 2 | one chip color area sensor | unsigned short |
| File Source | a300 | 03 | | undefined |

FIG. 1

| Entry | Tag | Value | Meaning | Format | Dynamic |
|---|---|---|---|---|---|
| Make | 010f | Sisvel | | ascii string | NO |
| Model | 0110 | Model 1 | | ascii string | NO |
| Orientation | 0112 | 1 | 0 degrees | unsigned short | YES |
| X Resolution | 011a | 180/1 | 180.00 | unsigned rational | YES |
| Y Resolution | 011b | 180/1 | 180.00 | unsigned rational | YES |
| Resolution Unit | 0128 | 2 | inch | unsigned short | NO |
| Date/Time | 0132 | 2001:06:09 15:17:32 | | ascii string | YES |
| YCbCr Positioning | 0213 | 1 | centre | unsigned short | YES |
| Exif Offset | 8769 | 184 | | unsigned long | YES |
| Exposure Time | 829a | 1/350 | 0.00 | unsigned rational | YES |
| F Number | 829d | 40/10 | 4.00 | unsigned rational | YES |
| EXIF Version | 9000 | 30 32 31 30 | | undefined | NO |
| Date Time Original | 9003 | 2001:06:09 15:17:32 | | ascii string | YES |
| Date Time Digitised | 9004 | 2001:06:09 15:17:32 | | ascii string | YES |
| Component Configuration | 9101 | 01 02 03 00 | | undefined | NO |
| Compressed Bits/Pixel | 9102 | 3/1 | 3.00 | unsigned rational | NO |
| Shutter Speed Value | 9201 | 553859/65536 | 8.45 | signed rational | NO |
| Aperture Value | 9202 | 262144/65536 | 4.00 | unsigned rational | YES |
| Exposure Bias Value | 9204 | 0/3 | 0.00 | signed rational | YES |
| Max Aperture Value | 9205 | 194698/65536 | 2.97 | unsigned rational | NO |
| Subject Distance | 9206 | 3750/1000 | 3.75 | unsigned rational | YES |
| Metering Mode | 9207 | 2 | centre weighted average | unsigned short | YES |
| Flash | 9209 | 0 | not used | unsigned short | YES |
| Focal Length | 920a | 346/32 | 10.81 | unsigned rational | YES |
| Maker Note | 927c | 0a | | undefined | NO |
| User Comment | 9286 | 00 00 00 00 00 00 | | undefined | NO |
| Flash Pix Version | a000 | 30 31 30 30 | | undefined | NO |
| Color Space | a001 | 1 | sRGB | unsigned short | NO |
| Exif Image Width | a002 | 640 | | unsigned short | NO |
| Exif Image Height | a003 | 480 | | unsigned short | NO |
| Exif Interoperability Offset | a005 | 1088 | | unsigned long | NO |
| Focal Plane X Resolution | a20e | 640000/206 | 3106.80 | unsigned rational | NO |
| Focal Plane Y Resolution | a20f | 480000/155 | 3096.77 | unsigned rational | NO |
| Focal Plane Resolution Unit | a210 | 2 | inch | unsigned short | NO |
| Sensing Method | a217 | 2 | one chip color area sensor | unsigned short | NO |
| File Source | a300 | 03 | | undefined | NO |

FIG. 3

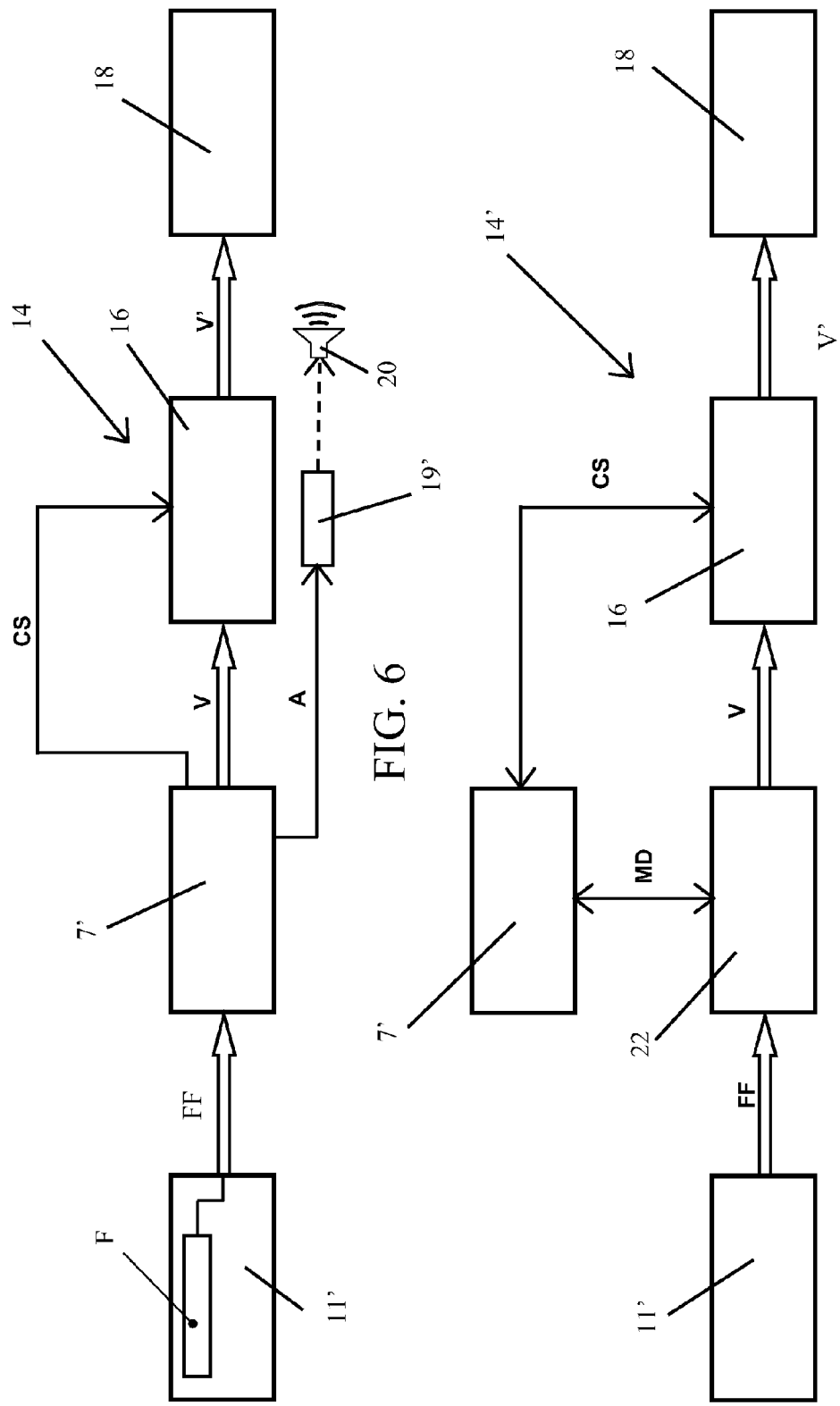

PROCESSES AND DEVICES FOR RECORDING AND REPRODUCING MULTIMEDIA CONTENTS USING DYNAMIC METADATA

BACKGROUND OF THE INVENTION

1. Field of the Invention

The present invention relates to processes and devices for recording and reproducing multimedia contents by using dynamic metadata.

2. Present State of the Art

Numerous portable devices have existed for many years which are used for recording digital multimedia formats, such as audio, video and photographs. Besides these portable devices, an increasing number of cellular telephones have made their appearance which, in addition to providing the typical functions of a mobile telephone, also allow to record video clips or to take digital photographs in accordance with the latest digital compression standards.

Besides offering the typical capabilities of a cellular telephone, such devices are also characterized by a number of peculiarities that enrich their functionality, such as, for example, GPS localization systems, accelerometers, orientation sensors, brightness sensors, etc.

These devices currently allow taking digital photographs, which are then stored and sorted in files; in addition, these devices allow particular information, called "metadata", which provides more information about a picture, to be automatically entered into the same files or into files associated therewith.

Some examples of metadata entered into particular fields of a file containing a digital photograph are the following: name of the manufacturer of the capturing device, capturing device model, photograph orientation, shooting date and time, exposition time, flash use, geographic coordinates, etc.

These metadata are fixed and non-dynamic. They are entered into particular areas of the file structure and are generally associated with digital photographs, but may also be used for multimedia contents of different kinds, such as audio and/or video, which vary over time.

For video-containing files, which are generally dynamic, these static metadata do not allow to optimally manage the visualization of the video on the display. In particular, if when shooting the video, for example, the video camera orientation changes, the metadatum associated with orientation is not modified. It follows that, during the subsequent reproduction of the video, the reproduction device may not realize that the shooting orientation has changed, with the consequence that the visualization of the video on the screen may not be automatically adapted. In general, this is particularly critical when the content is a part of a multimedia stream which can generally vary over time, and whose capture settings, such as shooting orientation direction, may also change, which is often the case especially with mobile and portable capturing devices.

Currently, several formats exist for defining metadata associated with images. The most common ones are EXIF (Exchangeable Image File Format) and IPTC (International Press Telecommunication Council).

EXIF is a metadata format which has been typically defined for images, whereas IPTC has defined a set of generic metadata formats for different types of files containing text, images or any multimedia content.

Some of these metadata are fixed and cannot be changed by the user, while other metadata, such as those specified by IPTC, are modifiable by the user. In both cases, however, they are static metadata, and therefore they are metadata which do not modify their own values coherently with the variable content of the multimedia file, which may change its own characteristics (e.g. shooting orientation) as shooting is taking place (in the typical case of a video content).

This is a problem because, in general, multimedia shooting may occur at different times, in different places and, as a consequence, in different environmental conditions; if these variations are not taken into account, the reproduction of the multimedia contents may not be optimal and may not be adapted to the environmental conditions which were present at shooting time.

SUMMARY OF THE INVENTION

It is one object of the present invention to define a physical structure of dynamic metadata whose values are modified coherently with variations in the data returned by the sensors (GPS localizers, accelerometers, orientation sensors): said variations may occur when shooting a video or taking any other multimedia signal (audio, video and audio, etc.). In this manner, when reproducing the file containing the recorded multimedia signal, the reproduction device can reproduce the multimedia content optimally in accordance with the dynamic metadata contained in the same multimedia file.

It is another object of the present invention to provide a reproduction device which uses said dynamic metadata in an optimal manner.

It is a further object of the present invention to provide an operating process for said reproduction device which uses said dynamic metadata.

These and other objects and advantages of the invention, which will become apparent from the following description, are achieved by defining a structure of dynamic metadata, a device for using them, and an operating process for said device as described in the respective claims. Preferred embodiments and non-obvious variants of the present invention are specified in dependent claims.

It is understood that all the appended claims are an integral part of the present description.

In general, it must be pointed out that, within the context of the present patent, the terms "multimedia" content, stream and file refer to, without distinction, a multimedia content, stream or file comprising video data only or a combination of audio and video data, even though the present invention proves particularly useful in the presence of at least video data.

BRIEF DESCRIPTION OF THE DRAWINGS

The present invention will be described in detail below through some preferred embodiments thereof, which are only provided by way of non-limiting example, with reference to the annexed drawings, wherein:

FIG. 1 shows an example of the EXIF metadata structure of a digital photograph;

FIG. 3 shows an example of a dynamic metadata structure according to the present invention;

FIGS. 6 and 7 are two block diagrams of two respective embodiments of a multimedia reproduction device of the present invention.

DETAILED DESCRIPTION OF THE PREFERRED EMBODIMENTS

Figure 2:
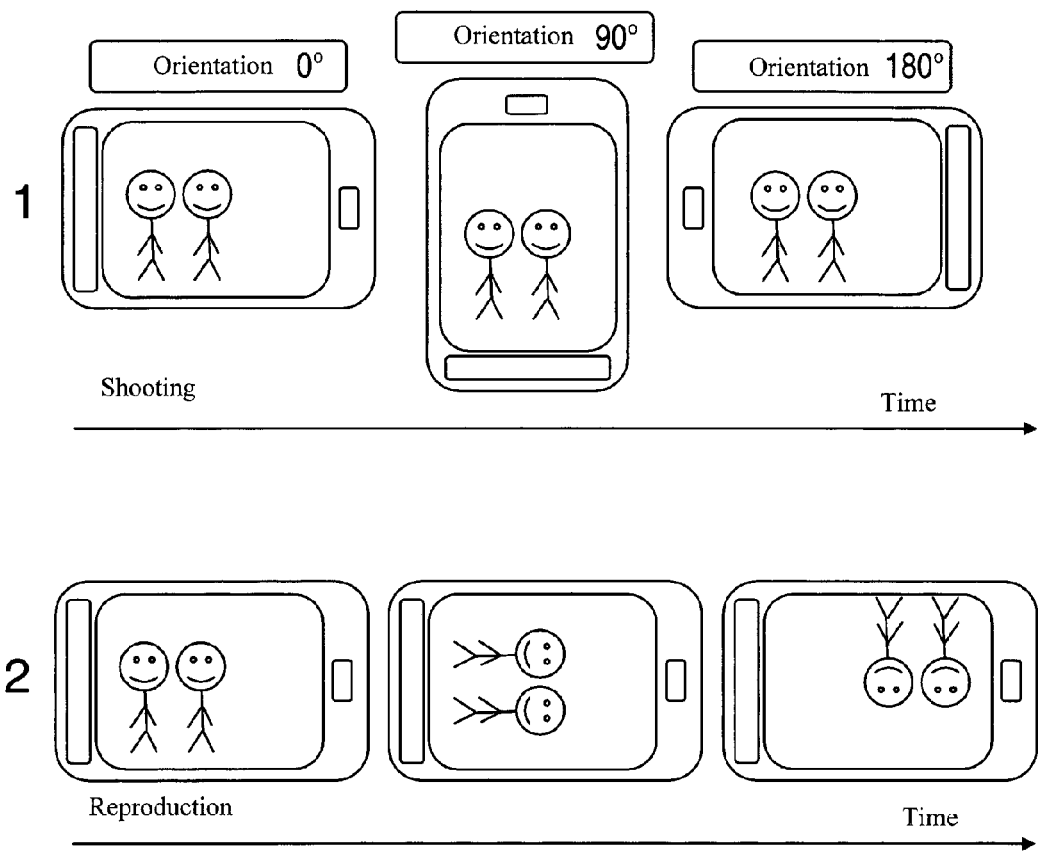
FIG. 2 shows a typical problem which may arise when using static metadata.

The goal of the present invention is to define a structure of dynamic metadata which improve the fruition of multimedia files (e.g. videos). The dynamic metadata can be updated during multimedia shooting (audio, video, etc.) in accordance with values returned by sensors (GPS, accelerometer, orientation sensors, etc.).

In addition to performing the normal functions for which they were developed, the latest cellular telephones and portable video cameras are also equipped with several sensors, such as, for example, three-axis gyroscopes, accelerometers, proximity sensors, orientation sensors, environmental light sensors, GPS localizer, etc. These sensors enrich the basic functionalities of the devices, thus making the devices more practical for the user.

For instance, devices equipped with such sensors can provide more information about the created multimedia files (images, video, audio) by entering special data (hereafter referred to as metadata) generated by the sensors or anyway obtained from or associated with said data. Typically, these metadata are added into special memory areas of the multimedia file. In this way, the reproduction device commanded to reproduce the multimedia file can afterwards provide further information to the user, e.g. by indicating the geographic position of the image displayed when playing a video content, or by adapting the image in accordance with the shooting orientation thereof, or by changing the speed or mode of reproduction of a video that was shot by accelerating or moving the camera too much.

Currently there are several metadata formats which are recognized at international level: two examples are the EXIF and IPTC formats. FIG. 1 shows an example of EXIF metadata associated with a digital photograph. EXIF also defined, in document JEITA CP-3451 (http://www.exif.org/Exif2-2.PDF), metadata for information coming from a GPS system.

Such metadata have been conceived for being stored into a particular memory area of the multimedia file, with well-defined format and structure. The metadata currently in use are static, and cannot change their own values, for example while the multimedia file is being reproduced.

Static metadata associated with dynamic multimedia files (e.g. audio or video files) do not allow optimizing the reproduction of the latter.

By way of example, let us consider the static metadatum "orientation" associated with a video file. This metadatum is stored at the beginning of the video shooting: if the user rotates the camera once or multiple times while shooting, the orientation will change several times and this information will be lost, and therefore it cannot be dynamically associated with the video.

Afterwards, while playing the recorded video, the device will display the video as a function of the single static metadatum "orientation" stored, whose initial value will be the one returned by the orientation sensor (or gyroscope). The adaptation of the visualization of the video to the screen will be correct only as long as the shooting orientation remained unchanged. Conversely, if the camera orientation was changed when shooting, the device will not be aware of it and hence it will not be able to optimize the visualization of the video content.

FIG. 2 shows a schematic representation of this problem. The first graph (1, 1') shows the shooting process at three different instants, when it is assumed that the user rotates the camera with three different types of orientation (0°, 90°, 180°), while keeping the scene being framed substantially unaltered. In the second graph (2) the user is playing the video just recorded: at a first instant the scene is displayed correctly; at a second instant the device does not realize that the scene has been rotated by 90° with respect to the initial instant; at a third instant the device again does not realize that the scene has been rotated by 180° with respect to the initial instant.

As shown in FIG. 2, when reproducing the video the orientation of the images is incorrect, and the user will have to manually rotate the device in order to follow the orientation of the video reproduction.

One solution to this problem is defining and introducing new types of dynamic metadata MD to be associated with the multimedia files F: the value of said dynamic metadata MD can be changed in accordance with data returned by respective sensors included in the device.

One example of a structure of dynamic metadata MD is defined in FIG. 3. In particular, it can be seen in this Figure that, besides the typical columns of static metadata (Entry, Tag, Value, Meaning, Format, Components), an additional column "Dynamic" has been introduced, whose possible values are "YES" or "NO".

When the value of the column "Dynamic" corresponding to a particular metadatum is "NO", then that metadatum must be considered to be static and must be treated as such.

When the value of the column "Dynamic" corresponding to a particular metadatum is "YES", then that metadatum must be considered to be dynamic.

When a metadatum is dynamic, the device has to expect that the value of that metadatum initially indicated in the column "Value" of FIG. 3 will be updated.

The updated value of that metadatum must be entered into the multimedia file F and must be updated through the data detected by the sensor concerned (three-axis gyroscopes, accelerometers, proximity sensors, environmental light sensors, GPS localizer). When the device acquires the updated metadatum MD, it will behave accordingly: for example, if orientation was changed, the device may rotate the image displayed on the screen, or, if the brightness of the scene changed during shooting, during playback the device may adapt the brightness of the screen in accordance with the value obtained from the environmental light sensor. In yet another example, the device may display the video and simultaneously indicate the exact point of shooting in motion on a digital geographic map, by using the dynamic metadata MD providing information about the GPS coordinates obtained from the GPS localization sensor or localizer.

Another example of implementation of the invention is to dynamically acquire, when recording, the accelerated or decelerated motion undergone by the shooting device by means of motion sensors (e.g. accelerometers) like those used for detecting situations wherein a photograph is taken with a moving camera. The reproduction device acquires the dynamic metadatum MD indicating the accelerated or decelerated movement undergone by the shooting device when shooting, and can thus adopt appropriate countermeasures to reduce the annoying effect caused by unevenly moving images. Such countermeasures may consist, for example, in automatically reducing the speed of reproduction of the video content or, likewise, in replicating some of the sequential images forming the video stream V being reproduced. The rate of speed reduction or replication of images of the video sequence may advantageously be varied according to the quantity of linear or angular acceleration indicated by the corresponding metadatum, in particular in a way directly proportional thereto in order to obtain the most effective reproduction adaptation.

In one particular example, the updated value of the dynamic metadatum MD is entered into the compressed multimedia stream FF, in particular into the signalling fields of the multimedia stream FF. The term signalling field refers herein to portions of space of the stream FF or multimedia file F for entering signalling and/or control data related to portions of the multimedia stream FF.

By way of example, in multimedia content compressed into the H.264 format, the updated values of the dynamic metadata MD may be entered into the signalling field SPS (Sequence Parameter Set) or into the signalling field PPS (Picture Parameter Set).

In another particular example, the updated value of the dynamic metadatum MD is entered into the uncompressed multimedia stream FF, in particular into the signalling fields of the multimedia stream FF.

In another example, the updated metadata MD can be entered into the signalling fields of the containers (some examples of multimedia container formats are AVI, MKV, 3GP, MOV, WMV, etc.) of the multimedia streams FF. Entering the metadata MD into the multimedia containers allows using the dynamic metadata MD regardless of the compression rate of the video or audio placed in the multimedia container.

In another example, the updated value of the dynamic metadatum MD is entered into the same portion of the multimedia file F which contains the subtitle or chapter information of the multimedia file F.

The updated values of the metadatum must contain at least the field "Tag" or equivalent, the purpose of which is to identify the metadatum MD, and the field "Value" or equivalent, which indicates the updated value of the metadatum MD. In this manner, the device can easily identify the metadatum MD and the updated value thereof. The field comprising the value "Value" or equivalent may alternatively contain the difference between the value of the metadatum MD and the previous value of the same metadatum MD; in general, this allows for a reduction of the number of bits required for representing it.

The dynamic metadata MD can be entered with different frequency. Typically a video content is made up of a sequence (or stream) of fixed images which may be coded, compressed and entered into a container format, which may also incorporate an audio signal A associated with the video content V. In view of implementing the present invention, it is necessary and sufficient that the metadata are dynamically associated with the images they refer to, with time tolerances which may depend on many factors, such as, for example, the speed of variation of the metadata MD, i.e. the speed at which the shooting parameters detected by the respective sensors change.

In particular, in the event of extreme time variability of the values detected by the sensors, i.e. when they are likely to change from one image to the next, the dynamic metadata MD may be associated with each image of the sequence that makes up the video content. In the most common cases, however, it may be sufficient to enter one new metadatum MD after a fixed and predetermined number of images (e.g. every 16 images), or this may be made to occur with a certain time frequency (e.g. once per second).

In a manner wholly irrelevant for the purposes of the present invention, the frequency of entry of the metadata MD may be made variable and dependent, for example, on the degree of variability of their value. It may be established, for example, that one metadatum related to a certain parameter is only entered if there is a significant difference from the previous value, so that values showing insignificant differences are not entered into the multimedia content. If the frequency of entry is fixed, the reproduction device can deduce from the absence of the value of the metadatum MD at a certain point of the multimedia content that that metadatum has not changed for that image or group of images of the sequence. Moreover, the metadatum value entered may also be the offset or difference with respect to the previously entered value, so as to reduce the number of bits required for representing the corresponding numeric value.

As an alternative or in addition, said frequency may be set or changed by the user of the recording device. Likewise, a predetermined (default) metadata entry frequency may be set in the production stage and the user may be allowed to change that default value, e.g. within a certain range of values suitable for the metadatum MD concerned.

It is in fact apparent that, for example, a metadatum MD related to the place of shooting generally has a much smaller degree of variability than environmental light or frame orientation. It is therefore appropriate and advantageous to enter localization-related dynamic metadata MD with a shorter frequency than those related to brightness or frame orientation.

The frequency of metadata detection and entry may be different for each metadatum MD or, to make operations simpler, it may be the same for some or all of the metadata MD processed by the shooting/recording device.

Figure 4:
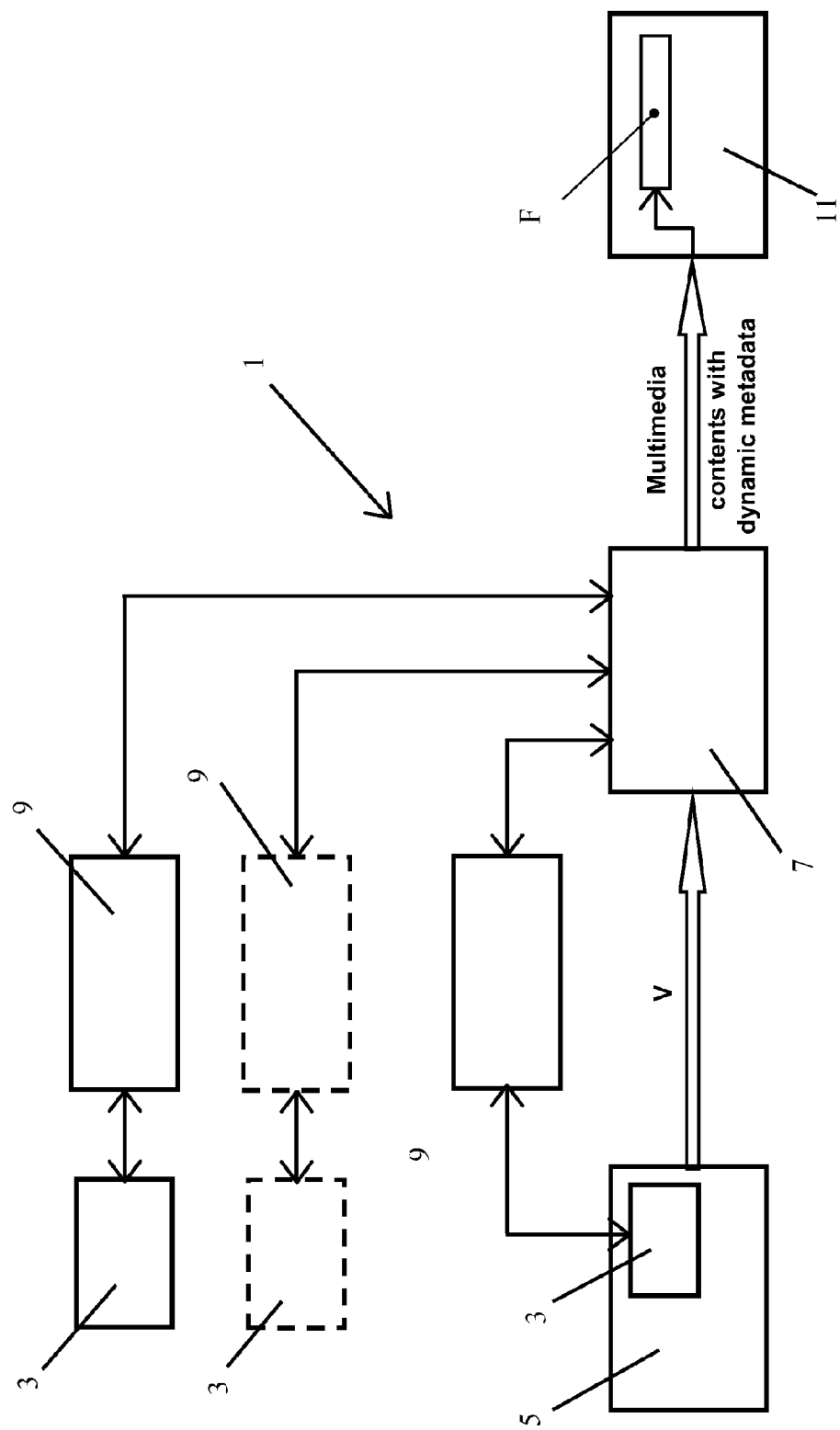
FIGS. 4 and 5 are two block diagrams of two respective embodiments of a recording/capturing/shooting device of the present invention.

FIG. 4 shows the basic structure of a device 1 for shooting/recording a multimedia content. It comprises one or more sensors 3 which detect the values of the parameters that must be monitored (GPS position, orientation of the device 1, environmental brightness, acceleration, and so on). Some of these sensors 3 may also be associated with or incorporated in the multimedia content acquisition devices 5, such as, for example, a CCD or CMOS video capturing sensor 5 or an audio capturing microphone 6, not shown in FIG. 4, but shown in FIG. 8. The values detected by said sensors 3 are sent to the data control and processing unit 7 via data connection lines, with the interposition of, when necessary, conditioning and adaptation units 9 which allow, for example, changing the operating mode of the sensor (sampling rate, sensitivity, etc.) and performing any pre-processing on the detected values (sampling, quantization, scale conversion, amplification, etc.). Said conditioning and adaptation units 9 may also be absent or may be built in the sensor 3 itself, with which they will form a single functional block.

The data control and processing unit 7 enters the metadata values detected by the sensors 3 into the multimedia file F coming from the devices 5, which are capturing its content (e.g. video and audio) according to the currently valid modes and rules. The information about said modes may be stored into a memory 11 of the device 1, and may also include the metadata standard in use (EXIF, IPTC, proprietary).

The operation of the shooting/recording device 1 can usually be controlled through the combined use of an interactive menu and control means (keyboard, touch screen, etc.), through which the user can issue commands and adjust functions. It may advantageously be provided that the device 1 shows, in one of the screens of said menu, the currently valid operating parameters for acquiring the dynamic metadata MD of the sensors 3, and allows, when appropriate, changing the value of said parameters through the control means associated with the device 1. This operation may be inhibited when recording/capturing the multimedia file F. The user may even be allowed to deactivate the entry of the dynamic metadata MD, if they are thought to be useless or if one wants to preserve the largest compatibility with existing static metadata.

It is also conceivable that the user can deactivate the dynamic capturing mode for a certain metadatum or can even directly set the value thereof; such value may be fixed for the entire duration of the capture session, or until the shooting/recording device 1 is turned off, or until a new setting is made by the user.

The data control and processing unit 7 may consist, in general, of one or more integrated circuits supervising the operation of the device 1 and coordinating the operations carried out by the various units involved, to which it is connected through signalling and control connections which are only partially shown in FIG. 4 and in the following figures. It can be partially implemented in software form as a set of instructions of a program residing in an operating memory (FPGA, ASIC), with modalities and structures known to the skilled in the art.

The data control and processing unit 7 stores the multimedia content containing the dynamic metadata MD, previously entered under its own control, into a memory MMM as a multimedia file F, possibly compressed and coded (e.g. MPEG 2, MPEG 4) within a container (e.g. WMV, AVI, TS, MKV), and therefore it may also carry out the related coding and compression operations. The memory 11 may be any memory suitable for containing multimedia files; it may therefore be, for example, of the volatile or non-volatile type, of the RAM or ROM type, semiconductor type (CMOS, flash), magnetic type (hard disk), optical type (CD, DVD, Blu-ray disk), removable type (USB key) or non-removable type (RAM chip).

Figure 5:
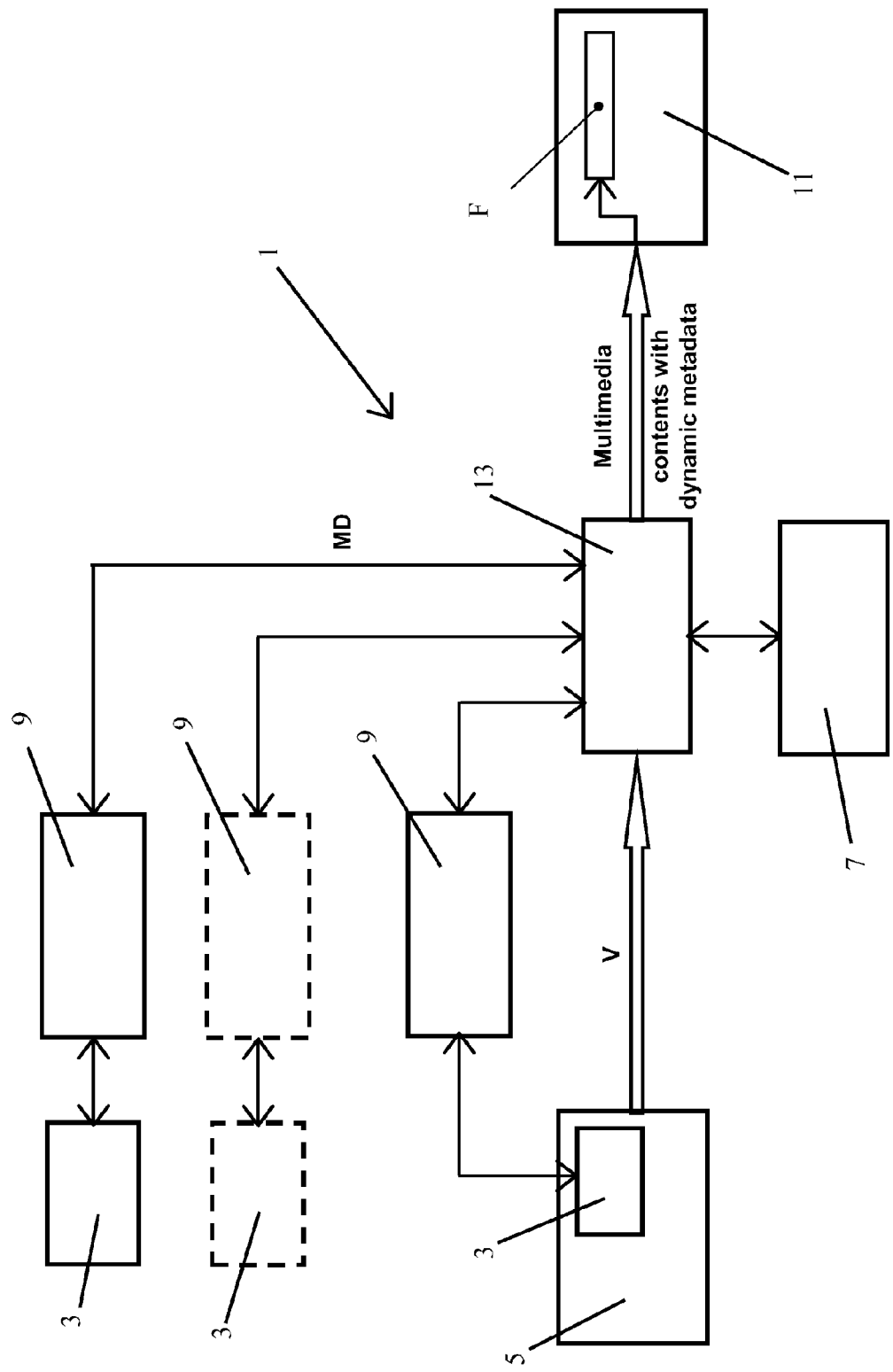

FIG. 5 shows an embodiment of the shooting/recording device 1' which is alternative to that of FIG. 4. In this device 1', the task of entering the metadata detected by the sensors 3 is carried out by a specific entry unit 13, which receives the values detected by the sensors 3 and the multimedia content captured by the multimedia content acquisition devices (e.g. the video acquisition device 5 of FIG. 5 and an audio acquisition device, not shown). The entry operation occurs under the control of the data control and processing unit 7, which thus is not excessively overloaded with the stringent real-time operations necessary for entering the dynamic metadata MD "on the fly". Moreover, this entry unit 13 may also perform other functions which are of little interest for the purposes of the present invention, such as analog-to-digital conversion, coding and compression of the video, and possibly also audio, multimedia data, insertion into a container format, and so on, which in the layout shown in FIG. 4 are carried out by the data control and processing unit 7.

FIG. 6 shows a first embodiment of a reproduction device 14 according to the invention.

Let us assume that the user of the reproduction device 14 has issued the command of reproducing a multimedia file F contained in a memory 11'. A data control and processing unit 7' acquires the multimedia file F from the memory 11', extracts the dynamic metadata MD incorporated in the multimedia stream FF associated with said multimedia file F, and obtains therefrom conditioning signals CS, which are then sent to a video processor 16 that controls the operation of an associated display device 18 (e.g. a screen or projector). In turn, the video processor 18 receives the multimedia stream FF read from the memory 11' and adapts the mode of reproduction of the multimedia stream FF according to the conditioning signals CS received from the data control and processing unit 7'. Interaction between the unit 7' and the processor 16 occurs in a manner such that the multimedia stream FF is reproduced by the reproduction device 14 in a way dynamically adapted to the values of the dynamic metadata MD entered by the recording device 1.

If, for example, the metadatum containing the value of the mean brightness of the scene detected by the corresponding sensor 3 decreases, the brightness of reproduction by the device 14 will be automatically increased in order to compensate for the reduced visibility perceived by the spectator, and will afterwards be decreased again should the brightness of the scene increase. In the case wherein a part of multimedia content was taken by the shooting device 1 with excessively abrupt and discontinuous motion, in accordance with a preset criterion the reproduction device 14 may, for example, automatically slow down the video reproduction speed in a manner proportional to the acceleration rates detected by the corresponding sensors 3 of the shooting device 1, which can be inferred from the metadata accordingly entered by the latter into the multimedia stream FF.

Thus, the data control and processing unit 7' controls the reproduction of the multimedia stream FF according to pre-established rules regarding the adaptation of the reproduction of the multimedia content to the values of the metadata providing information about the shooting or capturing conditions thereof. These rules may be established when manufacturing the device 14 and may be modifiable by the user, at least within certain predetermined limits. For example, the user may be allowed to change the degree of adaptation of the reproduction brightness to the shooting brightness detected by the sensors, or the rate of proportionality between the motion speed detected through the corresponding metadata and the speed reduction introduced by the display device 18 during playback.

The reproduction device 14 may also exploit the content of the dynamic metadata MD to add updated information to the images being reproduced. For example, when reproducing a multimedia stream FF captured in a moving vehicle, the reproduction device 14 may dynamically obtain the position in which the multimedia content was shot from metadata containing localization information provided, when shooting, by a GPS localization sensor 3 included in a recording device 1 according to the present invention. It is thus possible, through suitable processing, to draw on a geographic map the succession of the positions in which the multimedia stream FF was taken, thereby considerably increasing the information content of the video stream V and making it easier for a spectator, for example, to recognize places if visibility was not good or to retrieve from an archive multimedia contents captured in predetermined geographical areas (streets, districts, etc.), in the case, commonly found in practice, wherein the metadata associated with the multimedia contents in the archive can be indexed and searched for by the user.

The operation of the reproduction device 14 can usually be controlled through the combined use of an interactive menu and control means (keyboard, touch screen, etc.), through which the user can issue commands and adjust functions. It is advantageously conceivable that the device 14 shows, in one of the screens of said menu, the operating parameters which are currently valid for using any metadata possibly found in the video stream V (adaptation of reproduction to shooting conditions, or visualization of additional information) and allows, when thought appropriate, to change the value of such parameters through the control means associated with the device 14.

As for those operating parameters which relate to automatic reproduction adaptation as a function of brightness variations in captured multimedia content, it is possible to display on a specific page of the interactive menu of the device 14 a numeric value comprised and adjustable between a minimum and a maximum values (e.g. 1-10), representing the degree of adaptation/compensation applied by the device 14. As an alternative or in addition, one may also employ graphic elements such as a graduated bar having a length proportional to the adaptation rate being applied. For higher numeric values (or a longer bar), a greater dynamic brightness increase will be applied by the reproduction device in the presence of the same reduction in the average image brightness; the opposite will apply in the event of an excessive increase of the latter.

The user may even be allowed to completely inhibit said adaptation, e.g. by entering the numeric value 0 (zero), by adjusting the bar to null length or by setting to OFF a specific menu option which, when deactivated, inhibits the possibility of adjusting the adaptation rate.

Another significant example is adaptation to the orientation direction of the video images. Typically, the video content of a multimedia stream FF reproduced on a display device has an approximately rectangular shape and may take four different orientations: horizontal, vertical, horizontal upside-down, and vertical upside-down. Conversely, the angle of rotation that the user may set on the shooting device is wholly arbitrary, in that it can be either positive or negative and can take any absolute value. The reproduction device 14 must decide if and when to perform any adaptation of the video image display orientation direction according to the rotation variation detected when reproducing the multimedia stream FF from the values of the related dynamic metadata MD. For example, it must be decided which rotation threshold value must be detected and how long the threshold must be continuously exceeded ("hysteresis") to change the orientation direction of the images being displayed.

These operating parameters can be programmed when manufacturing the device 14 by appropriately programming the data control and processing unit 7'. As an alternative, they can be made at least partially modifiable by the user, e.g. by defining preset operating profiles corresponding to a more or less dynamic adaptation of the display orientation direction made by the reproduction device 14. For example, one may employ values describing such profiles ("conservative", "average", "dynamic") and associated with progressively decreasing rotation threshold and hysteresis values, resulting in an increasing rate of adaptation of video reproduction to shooting; at the same time, however, this also leads to a higher risk of introducing useless or disturbing adaptations, e.g. if the user rotated the shooting device 1 only slightly or for a very short time, which did not actually require a change in the display orientation direction. The adaptation procedure may even be deactivated, as shown for the example relating to brightness adaptation.

Also, the operating parameters for adapting the reproduction to the capture modes may remain fixed for the entire duration of the reproduction session, or until the device is turned off, or until the user sets the parameter again.

The reproduction device 14 may also include audio reproduction means, such as, for example, an audio processor (shown with 19' in FIG. 8) and a sound emitting device 20, e.g. a loudspeaker. A separation unit (not shown in the drawings) may perform the task of separating the audio stream A and the video stream V from the multimedia stream, the corresponding outputs being connected to the respective audio and video processors.

It should be pointed out that the invention is likewise applicable to the audio content of the multimedia stream FF captured by the multimedia capturing device 1. For example, the latter may be equipped with a background noise or echo sensor 3, whose values are received by the unit 7 of the device 1, which then enters them in the form of dynamic metadata MD into the multimedia stream FF. During reproduction, the unit 7' of the reproduction device 14 extracts the dynamic metadata MD related to the sound content, processes them, and automatically generates a sound reproduction adapted to the sound capturing conditions (presence of background noise and/or echoes) in accordance with the active adaptation rules, sending suitable conditioning signals CS to the audio processor responsible for the sound reproduction device 20.

As an alternative to the structure shown in FIG. 6, the data control and processing unit 7' may be interposed between the memory 11' and the video processor 16 (and the audio processor, if present). In such a case, the video stream V is only acquired by the unit 7', which extracts the dynamic metadata MD, processes them, and generates conditioning signals CS for the video processor (thus producing a conditioned video stream V') according to the currently active operating modes. The unit 7' may also, in this case, perform the separation of the video stream V and audio stream from the multimedia stream, in addition to any other operations that reproduction may require, which are nonetheless irrelevant for the purposes of the present invention, such as decoding, digital-to-analog conversion, and so forth.

In a second variant, the unit 7' and the video processor 16 may be incorporated into a single integrated chip carrying out the functions of both blocks; this is particularly likely for small devices, where it is especially important to be able to ensure the utmost integration of the various electronic components.

FIG. 7 shows a second embodiment of the multimedia reproduction device 14' according to the invention. It differs from the device of FIG. 6 for the presence of a dynamic metadata extraction unit 22, which extracts the dynamic metadata MD and sends them to the unit 7' under the control of the latter. The unit 7' is thus relieved from the burden of executing real-time operations, such as extracting the dynamic metadata MD, as well as from other functions almost irrelevant for the purposes of the present invention, such as decoding the file, extracting the multimedia stream FF from the container format, and separating the video stream V and the audio stream A from the multimedia stream. FIG. 7 also shows a connection line that leads the audio stream, separated by the unit 7', to an audio processor 19', which processes said stream A and prepares it for reproduction by a sound reproduction unit 20, e.g. consisting of a loudspeaker.

The same considerations previously made for the corresponding components 7 and 11 of the shooting device 1 also apply to the data control and processing unit 7' and the memory 11'.

The display device 18 may be any device capable of displaying a video stream V. Therefore it may be, for example, a CRT, LCD, plasma, LED or back-projection screen, and it may either be incorporated in the reproduction device 14' or be an external device associated with the latter through a connection of any type, whether wired (e.g. HDMI, DVI, Display port, etc.) or wireless (e.g. Wi-Fi, Bluetooth, etc.).

Of course, the capturing device 1 of FIG. 4 or 5 may be built in the very same apparatus that incorporates the device 14, 14' of FIG. 6 or 7, thus creating a variety of possible multimedia content shooting and reproducing devices 24 according to the invention. One possible embodiment of said device is shown in FIG. 8.

The operation of the device when capturing a multimedia content will first be described. A set of sensors 3 detects the values of physical quantities (physical parameters) associated with the audio and video contents being captured by, respectively, the video capturing device 5 and the audio capturing device 6. In particular, the audio quantity sensor represented in FIG. 8 acquires the audio signal from the corresponding sensor 3 and measures a parameter associated with the audio signal (e.g. background noise, sound intensity peak), and transmits it to the entry and extraction unit 13'. The parameter values, after possibly being conditioned and adapted by a specific circuit, are then sent to the metadata entry and extraction unit 13', which dynamically enters into the multimedia stream FF (audio and video combination) the dynamically detected metadata corresponding to the values acquired in accordance with the currently active rules, under the control of the data control and processing unit 7". Then the unit 13', with or without collaboration from the unit 7", composes the audio stream A, the video stream V and the dynamic metadata MD into a multimedia stream FF (e.g. an MPEG transport stream), and stores the latter in the form of a multimedia file F (e.g. an AVI or MKV container format) into the memory 11".

During reproduction, the device 24 first extracts, through the unit 13', the multimedia file F to be reproduced as a multimedia stream FF, then extracts the dynamic metadata MD entered when shooting, and transfers them to the data control and processing unit 7" via a connection for control and signalling signals. Starting from the dynamic metadata MD received, and in accordance with the currently active rules, the unit 7" generates conditioning and control signals CS, which induce the video 16' and/or audio 19' processors to change the video and/or audio reproduction mode depending on the values of the dynamic metadata MD previously acquired for the images and/or the sounds of the multimedia stream FF. This implies the possibility of automatically and dynamically modifying the parameters with which the multimedia stream FF is reproduced, as well as of adding, still automatically and dynamically, additional information obtained from the sensors 3 when capturing the multimedia content.

Figure 8:
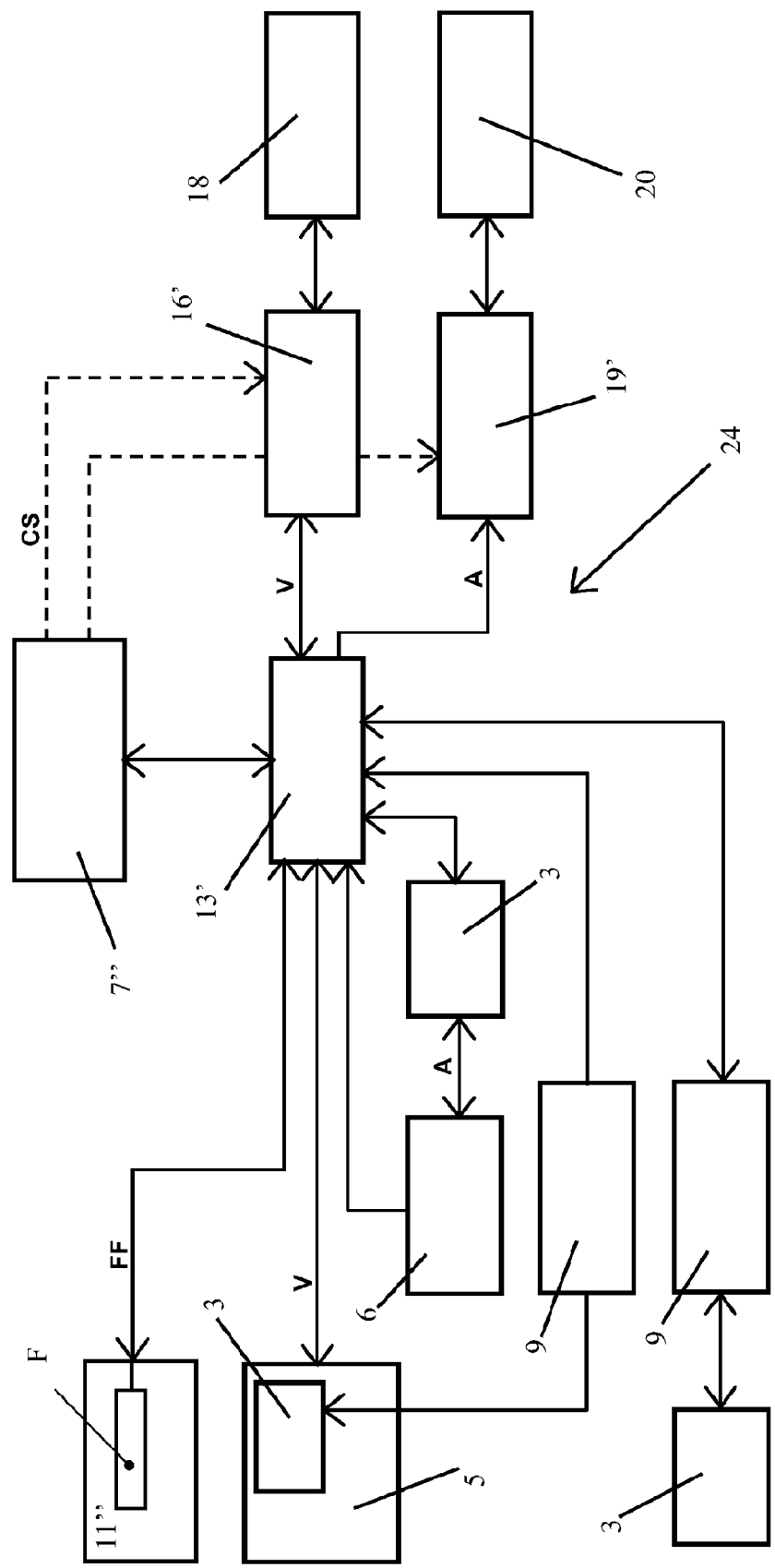
FIG. 8 is a block diagram of one embodiment of a shooting and reproduction device of the present invention.

The above considerations about the possible variations in the structure and in the distribution of the various functions within said structure also apply to the device 24 of FIG. 8. In particular, the various tasks may be divided between the units 7" and 13' in many ways, so that, for example, the unit 13' may carry out all real-time operations, such as producing the conditioning signals CS for the audio processor 19' and/or for the video processor 16' starting from the values of the dynamic metadata. In devices 24 which are not particularly complex, the two units 24 and 13" may be amalgamated and integrated into a single integrated circuit.

Also the two audio and video processors 16', 19' may be amalgamated into a single integrated circuit; in such a case, the latter will receive the multimedia stream FF, extract the video and audio signals therefrom, and convey said signals to the respective reproduction devices 18, 20.

The main advantage of the device 24 is that, in this case, the modalities with which the metadata are entered into the multimedia stream FF are not very important, in that such modalities are known to the apparatus, which can therefore extract them without difficulty. With distinct shooting and reproduction devices, on the contrary, said modalities may be unknown to one device or they may be different. Nevertheless, in order to ensure the largest compatibility degree between the dynamic metadata MD and the currently existing static metadata, it is advantageous that such modalities are backward-compatible, i.e. that they can also be used by reproduction devices which are not capable of interpreting the dynamic metadata MD according to the invention.

In one possible variant of the present invention, the sensors (3) included in the devices described so far can be replaced with units adapted to extract the capturing conditions from the multimedia content itself. For example, the unit may consist of a component which obtains the scene brightness by calculating the mean brightness of the pixels forming the image being captured, and outputs it to the data processing unit or to the metadata entry unit; or it may consist of a sound intensity peak detector, which measures the peak of the sound signal detected by the audio sensor (e.g. a microphone) during a certain time interval and outputs it to the unit that obtains therefrom the values to be entered into the multimedia file in the form of dynamic metadata.

The invention claimed is:

1. A process for shooting/capturing/recording multimedia contents for a multimedia acquisition device, comprising the steps of:
    acquiring a multimedia content in a form of a generally time-variable multimedia stream through video capturing means;
    acquiring data related to capturing conditions of the multimedia content with respect to at least one capture parameter through a dynamic detecting unit configured to detect said conditions;
    storing values dependent on at least said one generally time-variable capture parameter in predetermined areas of the multimedia file (F) associated with the captured multimedia content in a form of at least one dynamic metadatum (MD) for acquiring the multimedia content,
    wherein the step of storing values dependent on at least said one capture parameter is carried out in accordance with at least one predetermined storage operating parameter added to said metadatum (MD) and related to said metadatum (MD), wherein said storage operating parameter specifies a frequency with which the capture parameter is stored into the multimedia file in the form of the dynamic metadatum (MD).

2. The process according to claim 1, wherein said frequency is fixed.

3. The process according to claim 2, wherein said frequency is variable.

4. The process according to claim 1, wherein the dynamic detecting unit comprise at least one sensor adapted to measure physical quantities which is separated from the video capturing means, or at least one sensor adapted to measure physical quantities which is embedded into the video capturing means, or at least one processing unit which can derive the value of a physical quantity starting from signals coming from the video capturing means.

5. The process according to claim 1, wherein the dynamic detecting unit comprises, in addition to an image capturing unit, at least one conditioning and adaptation unit that allows changing the operating modes of the dynamic detecting unit, from which said values of said at least one dynamic metadatum (MD) are derived.

6. The process according to claim 1, wherein the multimedia file (F) is stored into a memory of the device in a compressed and coded form, in particular MPEG 2 or MPEG 4, within a container format, in particular WMV, AVI, TS, MKV, in order to combine the component video streams.

7. The process according to claim 1, wherein the device comprises at least one entry unit adapted to receive the values of said at least one dynamic metadatum (MD) detected by said dynamic detecting unit and to enter them into the multimedia content captured by and received from the multimedia content capturing means, the entry step being carried out under the control of a data control and processing unit.

8. The process according to claim 1, wherein the multimedia content is also acquired through audio capturing means.

9. A device for shooting/capturing/recording multimedia contents, adapted to carry out the process according to claim 1.

10. The process according to claim 1, wherein said frequency depends on a variation speed of the capture parameter.

11. A process for reproducing multimedia contents in a device for reproducing multimedia streams, comprising the steps of:
reading from a memory at least one multimedia file (F) comprising at least one multimedia content comprising at least one video stream (V);
reading data related to the capturing conditions of the multimedia content (capture parameters) in the form of at least one dynamic metadatum (MD) associated with the multimedia content of the multimedia file (F), and
dynamically modifying modes of reproduction of a multimedia stream (FF) corresponding to the multimedia file (F) depending on the values of at least said one dynamic metadatum (MD) associated with the multimedia content,
wherein the step of dynamically modifying the modes of reproduction of the multimedia stream (FF) is carried out in accordance with pre-established rules (operating parameters) that adapt the reproduction of the multimedia content to the values of the metadata (MD) that contain information related to the capturing conditions of the multimedia content,
wherein at least one storage operating parameter describing how the capturing conditions are added to said metadata, said at least one storage operating parameter stored as metadata in said multimedia content, said storage operating parameter specifying a frequency with which the capture parameter has been stored into the multimedia file in form of dynamic metadatum (MD).

12. The process according to claim 11, wherein said frequency is fixed.

13. The process according to claim 11, wherein said frequency is variable.

14. The process according to claim 11, further comprising the step of controlling and modifying the pre-established rules regarding the adaptation of the multimedia content to the values of the dynamic metadata (MD) through the combined use of an interactive menu and control means, in particular a keyboard, a remote control or a touch screen, in order to issue commands and adjust functions related to said rules.

15. The process according to claim 14, further comprising the step of showing, in one of the screens of the interactive menu, at least one of the operating parameters currently valid for using any metadata found in the at least one video stream (V), displaying in particular the values of the parameters used for adapting the reproduction to the shooting conditions, or comprising the step of showing additional information related to said capturing conditions of the multimedia content.

16. The process according to claim 15, further comprising the step of making the operating parameters at least partially modifiable, by defining preset operating profiles that correspond to a more or less dynamic adaptation made by the reproduction device to the modes of reproduction of the multimedia file (FF).

17. The process according to claim 11, wherein the operating parameter comprises data dependent on the capturing orientation of the video images or the mean brightness or the current position or the linear or angular acceleration of the device for capturing the multimedia content or the background noise intensity or a peak value of an audio signal captured by the capturing device.

18. The process according to claim 11, wherein the degree of automatic adaptation of the multimedia reproduction modes with respect to the operating multimedia content capturing conditions is represented by means of a numeric value comprised and adjustable between a minimum and a maximum values representing the degree of adaptation/compensation applied by the device.

19. The process according to claim 18, further comprising the step of completely inhibiting said adaptation, in particular by entering the numeric value 0, or by setting to OFF a menu option which, when deactivated, inhibits the possibility of adjusting the adaptation rate.

20. The process according to claim 11, further comprising the step of adapting the reproduction of the at least one video stream (V) to the video image capture orientation direction, the angle of rotation that can be applied to a shooting device being arbitrary, since it can be either positive or negative and can take any absolute value, the reproduction device deciding if and when to perform the adaptation of the video image display orientation direction according to the rotation variation detected when reproducing the multimedia stream (FF) from the values of the related dynamic metadata (MD).

21. The process according to claim 11, further comprising the step of programming the operating parameters when manufacturing the device by programming a data control and processing unit included in the device.

22. The process according to claim 11, wherein multimedia stream (FF) comprises the at least one video stream (V) and audio streams (A) and wherein the reproduction device further comprises at least one separation unit adapted to extract the audio streams (A) and the at least one video stream (V) from the multimedia stream (FF), the corresponding outputs being connected to respective audio and video processors.

23. The process according to claim 22, further comprising the step of reproducing audio content of the multimedia stream (FF) captured by a multimedia capturing device, the unit of the related device extracting the dynamic metadata (MD) related to the sound content, processing them and automatically generating a sound reproduction suited to the sound capturing conditions according to active adaptation rules, and sending suitable conditioning signals (CS) to the audio processor responsible for the sound reproduction device.

24. The process according to claim 11, wherein the device comprises a data control and processing unit interposed between the memory, a video processor and an audio processor, the at least one video stream (V) being only acquired by the unit, which extracts at least one of the dynamic metadata (MD), processes it and generates suitable conditioning signals (CS) for the video processor according to the currently active operating modes.

25. The process according to claim 11, wherein the multimedia reproduction device comprises at least one extracting unit for extracting dynamic metadata (MD), which is connected to said memory, to a data control and processing unit and to a video processor, said extracting unit taking care of extracting and sending the dynamic metadata (MD) to the unit under the control of the unit.

26. A device for reproducing multimedia contents, adapted to carry out the process according to claim 11.

27. The process according to claim 11, wherein said frequency depends on a variation speed of the capture parameter.

* * * * *